United States Patent
Galzin et al.

(10) Patent No.: US 12,202,607 B2
(45) Date of Patent: Jan. 21, 2025

(54) AIR CONDITIONING SYSTEM EQUIPPED WITH A SYSTEM FOR THE THERMAL MANAGEMENT OF OIL AND OF PRESSURIZED AIR

(71) Applicant: LIEBHERR-AEROSPACE TOULOUSE SAS, Toulouse (FR)

(72) Inventors: Guillaume Galzin, Toulouse (FR); Laurent Fayolle, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 443 days.

(21) Appl. No.: 17/438,924

(22) PCT Filed: Mar. 10, 2020

(86) PCT No.: PCT/FR2020/050492
§ 371 (c)(1),
(2) Date: Sep. 13, 2021

(87) PCT Pub. No.: WO2020/183104
PCT Pub. Date: Sep. 17, 2020

(65) Prior Publication Data
US 2022/0185485 A1 Jun. 16, 2022

(30) Foreign Application Priority Data

Mar. 11, 2019 (FR) ..................................... 1902465

(51) Int. Cl.
*B64D 13/06* (2006.01)
*B64D 13/02* (2006.01)
*F02K 3/115* (2006.01)

(52) U.S. Cl.
CPC ............. *B64D 13/06* (2013.01); *B64D 13/02* (2013.01); *F02K 3/115* (2013.01); *B64D 2013/064* (2013.01); *F05D 2260/213* (2013.01)

(58) Field of Classification Search
CPC .. B64D 13/02; B64D 13/06; B64D 2013/064; B64D 33/10; F01D 25/18; F02C 6/08; F02C 7/06; F02C 7/14; F02K 3/115
See application file for complete search history.

(56) References Cited

U.S. PATENT DOCUMENTS

2014/0083076 A1\* 3/2014 Phillips ................. F01M 5/002
60/39.08
2016/0061056 A1 3/2016 Appukuttan et al.
(Continued)

*Primary Examiner* — Scott J Walthour
(74) *Attorney, Agent, or Firm* — CRGO Global; Steven M. Greenberg

(57) ABSTRACT

Air conditioning system of an aircraft, comprising a thermal management system supplied with air, referred to as pressurized air (12), by at least one compressor (14) of the aircraft, and supplied with non-pressurized flow air (206; 208) from at least one engine of the aircraft, and characterized in that the thermal management system comprises: at least one pressurized-air/oil heat exchanger (20) designed to provide heat exchanges between a stream of pressurized air (12) and a first oil circuit (26), allowing heat to be transferred from the pressurized air (12) to the oil of the first oil circuit (26); at least one oil/flow-air heat exchanger (22a, 22b, 22c, 22d) designed to provide heat exchanges between a second oil circuit (28) and the flow air (206; 208), allowing the heat from said second oil circuit (26) to be transferred to the flow air (206; 208); and at least one circuit (30) connecting the first oil circuit (26) and said second oil circuit (28).

9 Claims, 2 Drawing Sheets

(56) References Cited

U.S. PATENT DOCUMENTS

2016/0131036 A1 5/2016 Bintz et al.
2017/0159490 A1 6/2017 Sennoun
2018/0038243 A1 2/2018 Rambo et al.

* cited by examiner

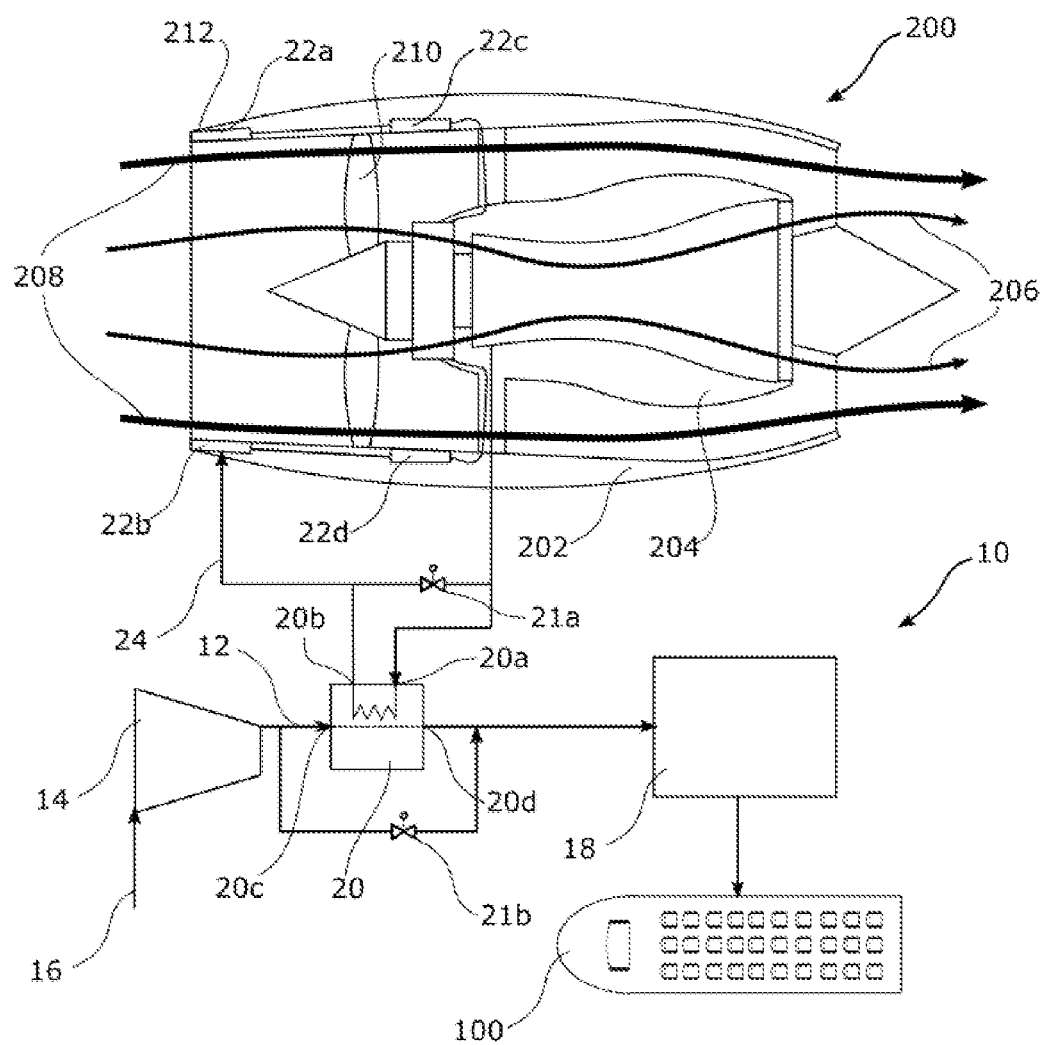
[Fig. 1]

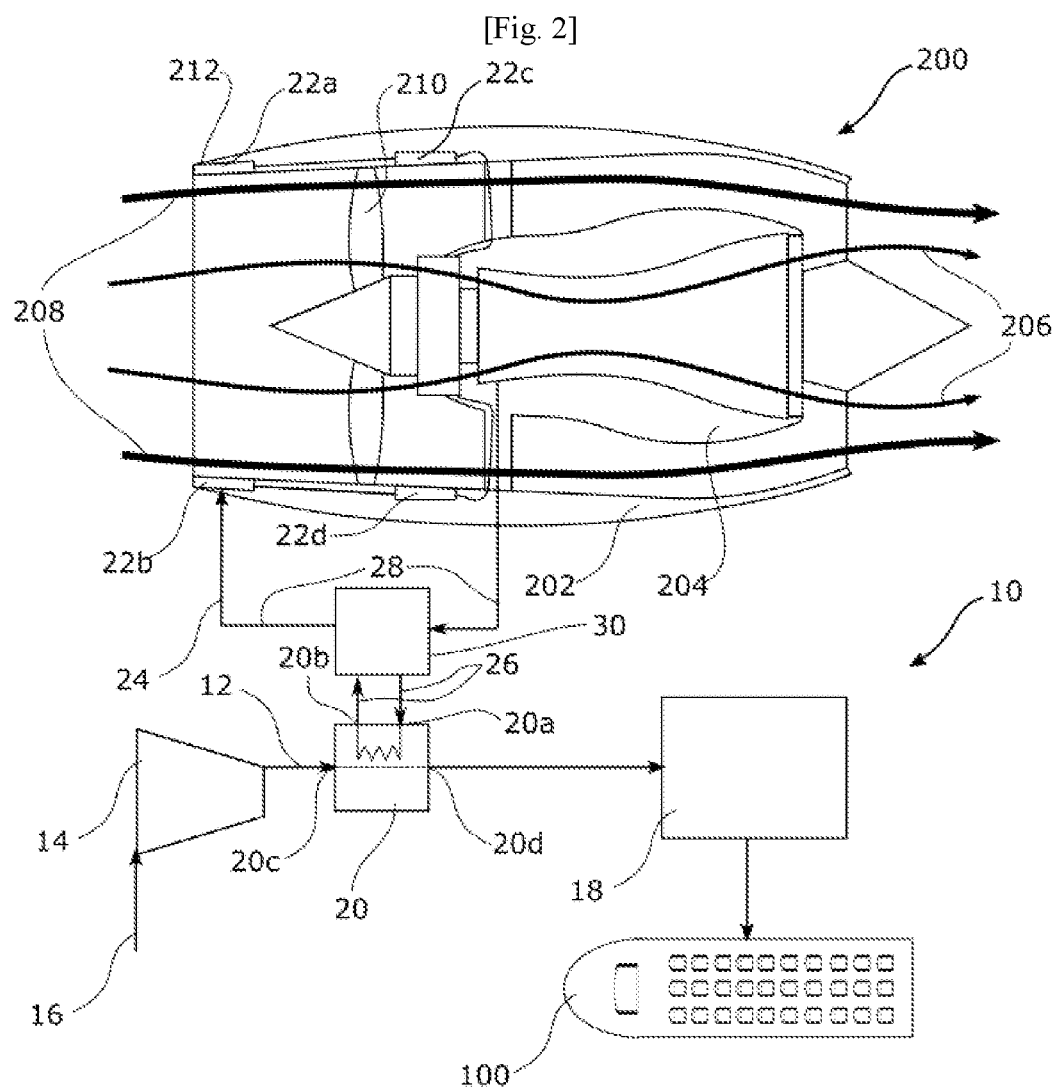

AIR CONDITIONING SYSTEM EQUIPPED WITH A SYSTEM FOR THE THERMAL MANAGEMENT OF OIL AND OF PRESSURIZED AIR

CROSS-REFERENCE TO RELATED APPLICATIONS

This application is a § 371 national phase entry of International Application No. PCT/FR2020/050492, filed Mar. 10, 2020, which claims priority to French Patent Application No. 1902465, filed Mar. 11, 2019.

TECHNICAL FIELD OF THE INVENTION

The invention relates to an air conditioning system comprising a cooling system. In particular, the invention relates to an air conditioning system for a cabin of an aircraft.

TECHNICAL BACKGROUND

In a vehicle, in particular an aircraft, many moving parts, such as the engine, need lubrication or oil cooling. This oil is subjected to the heat generated by the engine or by other elements of the aircraft and therefore has to be cooled for optimum operation.

A conventional oil cooling system of a turbojet engine of an aircraft comprises finned heat exchangers that are cooled, for example:
- by bleeding the flow-air output of the engine, referred to as "fan air", impeding the engine's consumption of kerosene; or
- directly from the flow output of the engine, by immersing the exchanger fins in the fan-air output, creating pressure drops and air flow disturbances in the flow air from the engine, and therefore reducing the thrust of the engine.

In aircraft engines such as turbofan engines with a very high bypass ratio (the bypass ratio being the ratio between the hot stream and the cold stream of the turbojet engine), pressure drops and flow disturbances in the flow air are no longer acceptable, as they greatly reduce the thrust of the engine. Furthermore, the negative impact of an air-flow-output bleed on the kerosene consumption of the engine is much greater than that of a conventional aircraft engine.

The flow air or "fan air" refers to the air passing through the engine. In a turbofan engine, said air consists of the primary stream and the secondary stream.

When the aircraft engine comprises a reduction gearbox, the heat output transmitted to the oil is much higher (typically 3 times higher) than in a conventional aircraft engine, requiring oversizing of the oil cooling system.

In addition, in an aircraft, the air conditioning system is supplied with air, referred to as pressurized air, from a compressor, which air has to be cooled to reach a temperature suitable for the supply of air to the cabin of the aircraft. This need for cooling is particularly important since the pressurized air is at a high compression ratio and therefore has a high temperature. The heat of this pressurized air is lost during cooling.

In addition, the volume available for the air conditioning system is small compared with that of a conventional aircraft engine.

AIMS OF THE INVENTION

The invention aims to provide an air conditioning system that provides thermal management of engine oil and of pressurized air.

The invention aims in particular to provide, in at least one embodiment of the invention, an air conditioning system which does not require air to be bled from the air flow of the engine.

The invention also aims to provide, in at least one embodiment of the invention, an air conditioning system having small dimensions.

The invention also aims to provide, in at least one embodiment of the invention, an air conditioning system for energy optimization by recovery and transfer of heat during heat exchanges.

The invention also aims to provide, in at least one embodiment of the invention, an air conditioning system for preheating engine oil before take-off, in cold conditions.

DISCLOSURE OF THE INVENTION

To this end, the invention relates to an air conditioning system for a cabin of an aircraft, comprising a thermal management system supplied with air, referred to as pressurized air, by at least one compressor of the aircraft, and supplied with non-pressurized flow air from at least one engine of the aircraft, and characterized in that the thermal management system comprises:
- at least one pressurized-air/oil heat exchanger designed to provide heat exchanges between a pressurized air stream and a first oil circuit, allowing heat to be transferred from the pressurized air to the oil of the first oil circuit;
- at least one oil/flow-air heat exchanger designed to provide heat exchanges between a second oil circuit and the flow air, allowing the heat from said second oil circuit to be transferred to the flow air; and
- at least one circuit fluidically connecting the first oil circuit and said second oil circuit.

An air conditioning system according to the invention therefore makes it possible, by means of its thermal management system, to carry out a dual transfer of heat between different air streams of the aircraft, while cooling the engine oil.

In particular, the pressurized air is cooled as it passes through the pressurized-air/oil heat exchanger. In this pressurized-air/oil exchanger, the pressurized air therefore forms a hot pass of the exchanger and the oil forms a cold pass of the exchanger. The pressurized air thus cooled is treated by the rest of the air conditioning system. The pressurized air is intended in particular for supplying an air conditioning pack of the air conditioning system, which pack is intended for adjusting the temperature, pressure and humidity of the pressurized air so as to obtain conditioned air which can be sent to the cabin of the aircraft.

In the prior art, this cooling of the pressurized air is generally carried out by bleeding flow air from the engine. The conditioning system according to the invention therefore makes it possible to eliminate this bleed in order to avoid loss of engine performance. Replacing this air bleed by an oil exchanger also makes it possible to reduce the dimensions, in particular by eliminating the pipes leading the bleed flow air to the pressurized-air/flow-air exchanger in the prior art.

Depending on the aircraft designs, the pressurized air is supplied, for example, by the compressor of one or more engines of the aircraft, or by a compressor dedicated to the air conditioning system, which compressor is motorized or driven by a turbine and draws air from outside the aircraft.

In addition, the engine oil is cooled as it passes through the oil/flow-air heat exchanger. In this oil/flow-air heat exchanger, the oil therefore forms a hot pass of the exchanger and the flow air forms a cold pass of the exchanger. This makes it possible to cool the engine oil, which is necessary for the proper functioning of the engine during periods of flight, and to heat the flow air of the engine, which increases the performance of the engine (in particular increasing thrust). Since some of the heat of the oil comes from the pressurized air, the air conditioning system thus indirectly transfers heat between the pressurized air and the flow air, via the engine oil. This allows overall energy optimization of the air conditioning system. Engine-oil cooling is no longer seen as a constraint reducing the performance of the engine, but fits perfectly into an overall system in which heat is transferred from pressurized air, where excessive heat is reduced, to flow air, where excess heat is useful.

In particular, engine-oil cooling is generally rated for a maximum cooling capacity which exceeds conventional operating conditions. The cooling margin resulting from this difference can therefore be used for cooling the pressurized air that is intended for supplying an air conditioning pack of the air conditioning system.

In addition, the fact that the engine oil is heated upon contact with the pressurized air allows, when the engine is started, faster preheating of the engine oil before take-off.

The thermal management carried out by the thermal management system therefore consists in, at the same time, cooling the pressurized air, heating the oil of the first oil circuit (useful during preheating), cooling the oil of the second oil circuit, and heating the flow air.

Engine oil in the broad sense refers, for example, to the lubricating oil of the power gearbox (PGB), or the lubricating oil of the accessory gearbox (AGB), or the cooling oil of the integrated drive generator (IDG), or the cooling oil of the electric generator, or any other cooling oil, lubricating oil, etc. which can be used by an engine- or generator-type component of the aircraft for cooling or lubricating this component, in particular for lubricating bearings of this component. Oil is generally shared among these components, but not necessarily, as some components may have a dedicated oil circuit.

More particularly, advantageously and according to the invention, the oil is an engine oil and the thermal management system comprises a lubrication passage designed to lubricate and cool bearings of the engine of the aircraft by means of the engine oil, said lubrication passage being integrated in the first oil circuit or the second oil circuit.

According to this aspect of the invention, the thermal management system uses engine oil and is fully integrated into the already existing part of the circuit formed by the lubrication passage. The thermal management system therefore does not need an additional circuit but consists in diverting the existing engine-oil circuit, both to improve the cooling of this engine oil and to use the heat transport capacity of this oil.

Advantageously and according to the invention, the oil/flow-air heat exchanger is a heat exchanger arranged in the engine of the aircraft and designed to have a heat exchange surface in direct contact with the stream of flow air passing through the engine.

Such an exchanger, also referred to as a skin exchanger, has small dimensions and reduces disturbances of the flow air by having no impact on the flow stream and by not carrying out bleeding, thus making it possible not to degrade the performance of the engine.

Advantageously and according to the invention, the oil/flow-air heat exchanger is arranged in an engine casing of the aircraft.

The casing refers to the housing around the engine in which the stream of flow air flows. In a turbojet engine, the casing guides the secondary air stream around the central part which consists of a compressor, a combustion chamber and a turbine, and in which the primary stream flows.

Placing the exchanger in the casing allows heat exchanges of the skin exchanger with the flow air to be maximized.

Advantageously and according to the invention, the oil/flow-air heat exchanger is arranged at a flow-air inlet in the engine casing of the aircraft.

The air inlet of the casing is a preferred position for maximizing heat exchanges and reducing disturbances of the flow air. In addition, the transmission of heat through the oil provides protection against icing of the engine inlet, which is one of the regions most subject to the formation of ice, which can be dangerous for the proper functioning of the engine.

Advantageously and according to the invention, the oil/flow-air heat exchanger is arranged in the casing downstream of a fan of the engine of the aircraft.

According to this aspect of the invention, heat exchange is maximized because the fan of the engine creates turbulence, which improves air circulation.

Advantageously and according to the invention, the oil/flow-air heat exchanger consists of a variety of elements arranged at a plurality of locations on the casing.

Advantageously and according to the invention, the pressurized-air/oil heat exchanger and the oil/flow-air heat exchanger are arranged in series.

The first oil circuit, the second oil circuit and the connecting circuit can thus form a single circuit.

Advantageously and according to the invention, the pressurized-air/oil heat exchanger and the oil/flow-air heat exchanger are arranged in parallel.

The connecting circuit can, for example, be an oil tank from which the oil exits in order to enter the first and the second circuit, and into which the oil from the first and the second circuit is returned after passing through the respective exchangers.

Advantageously and according to the invention, the thermal management system comprises a circuit for bypassing the pressurized-air/oil heat exchanger, which circuit is designed to be controlled by a module for controlling the temperature of the pressurized air.

The presence of the bypass circuit makes it possible to control the temperature of the pressurized air according to the needs of the conditioning system, in particular according to the desired temperature at the pressurized air inlet and/or the desired temperature in the cabin of the aircraft.

The bypass can be either a bypass of the pressurized air (said air therefore does not pass through the pressurized-air/oil heat exchanger) or a bypass of the oil (said oil therefore does not pass through the pressurized-air/oil heat exchanger), or both.

The invention also relates to an aircraft comprising at least one engine, at least one compressor and an air conditioning system according to the invention.

The invention also relates to an air conditioning system and an aircraft that are characterized in combination by all or some of the features mentioned above or below.

LIST OF FIGURES

Further aims, features and advantages of the invention will become apparent upon reading the following descrip- FIG. 1 is a schematic view of an air conditioning system according to a first embodiment of the invention.

FIG. 2 is a schematic view of an air conditioning system according to a second embodiment of the invention.

DETAILED DESCRIPTION OF AN EMBODIMENT OF THE INVENTION

For the sake of illustration and clarity, scales and proportions are not strictly adhered to in the drawings.

Moreover, identical, similar or analogous elements are denoted using the same reference signs throughout the drawings.

FIGS. 1 and 2 show an air conditioning system 10 according to a first and a second embodiment of the invention.

The air conditioning system 10 provides refrigeration and air conditioning for a cabin 100 of an aircraft during the flight of said aircraft. The aircraft comprises at least one engine 200.

In this embodiment, the engine 200 is of the turbofan-engine type, comprising a casing 202 surrounding a turbine engine 204 which conventionally comprises a compressor, a combustion chamber and a turbine (not shown). The turbine engine 204 generates a primary stream 206. A fan 210 connected to the turbine engine generates a secondary stream between the turbine engine 204 and the casing 202. The primary stream 206 and the secondary stream 208 are directed in the direction of the arrows representing said streams and constitute flow air of the engine.

The turbine engine 204 is supplied by at least one oil circuit, allowing said engine to operate correctly, in particular by allowing bearings of the turbine engine 204 of the engine to be lubricated and cooled. This oil heats up during operation of the engine and has to be cooled.

The air conditioning system 10 is supplied with air, referred to as pressurized air 12, by a compressor 14. According to different embodiments of the invention, the compressor 14 can be part of the conditioning system and be mainly dedicated to supplying the pressurized air 12, or be part of the engine 200 of the aircraft, in particular can be the compressor of the turbine engine 204. The compressor is supplied with bleed air 16.

The pressurized air 12 is treated by an air conditioning pack 18 for adjusting the temperature, pressure and humidity of the pressurized air 12 so as to obtain conditioned air which can be sent to the cabin of the aircraft. The air conditioning pack 18 can, for example, comprise a water extraction loop to reduce the humidity of the air, at least one turbine to reduce the pressure of said air, and at least one exchanger to control the temperature of said air.

The air conditioning system 10 comprises a thermal management system for reducing the temperature of the pressurized air 12. The thermal management system comprises at least one pressurized-air/oil heat exchanger 20 designed to provide heat exchanges between the pressurized-air stream and an oil circuit, allowing heat to be transferred from the pressurized air to the oil. The oil comes from the turbine engine 204, circulates in a first oil circuit, enters the pressurized-air/oil heat exchanger 20 through an oil inlet 20a and exits again through an oil outlet 20b. The pressurized air 12 enters the pressurized-air/oil heat exchanger 20 through a pressurized air inlet 20c and exits again through a pressurized air outlet 20d.

The pressurized air 12 is thus cooled as it passes through the exchanger and transmits some of its heat to the oil.

The thermal management system is also designed to cool the oil, and thus comprises at least one oil/flow-air heat exchanger designed to provide heat exchanges between the oil and the flow air, allowing the heat from the oil to be transferred to the flow air.

In particular, in this embodiment, the oil/flow-air heat exchanger consists of a plurality of skin exchangers, four of which can be seen here: two skin exchangers 22a, 22b are located at an engine-air inlet 212, at one end of the casing 202. These exchangers can thus have a de-icing function which prevents the formation of ice at the engine-air inlet, which is a region that is usually susceptible to the risk of ice formation. Two skin exchangers 22c, 22d are located on the casing 202 downstream of the fan 210.

The oil circulates in a second oil circuit and passes through each skin exchanger. The skin exchanger allows heat exchange with the flow air. Due to their positioning inside the casing 202, the skin exchangers 22a, 22b, 22c, 22d exchange in a preferred manner with the secondary stream 208 of the flow air.

FIG. 1 shows a first embodiment of the invention, in which the pressurized-air/oil heat exchanger 20 and the skin exchangers 22a, 22b, 22c, 22d forming the oil/flow-air heat exchanger are arranged in series: the first oil circuit and the second oil circuit form a single circuit 24.

In particular, the oil exiting the pressurized-air/oil heat exchanger 20 through the outlet 20b is then guided to a skin exchanger, in the same oil circuit. The heat recovered by the oil in the pressurized-air/oil heat exchanger 20 is transmitted directly to the flow air to heat said air (cooling the oil as it passes).

In this embodiment, depending on the desired temperature of the pressurized air 12, bypass circuits can be set up, for example via a bypass valve 21a for preventing the oil from passing through the pressurized-air/oil exchanger 20, or via a bypass valve 21b for preventing pressurized air 12 from passing through the pressurized-air/oil exchanger 20, or both, as shown here.

FIG. 2 shows a second embodiment of the invention, in which the pressurized-air/oil heat exchanger 20 and the skin exchangers 22a, 22b, 22c, 22d forming the oil/flow-air heat exchanger are arranged in parallel.

The first oil circuit 26 and the second oil circuit 28 are separate but connected by a connecting circuit 30, which can be, for example, an oil tank in which the oil from each circuit mixes and balances its temperature: the oil from the first circuit is heated as it passes through the pressurized-air/oil heat exchanger 20 and the oil from the second circuit is cooled by the oil/flow-air heat exchanger, and, due to the mixing in the oil tank, the temperature going from the tank to the exchangers is the same for the two circuits.

The invention claimed is:

1. An air conditioning system of an aircraft, the air conditioning system comprising:
   at least one compressor;
   an air conditioning pack; and
   a thermal management system supplied with pressurized air, by said at least one compressor, and supplied with non-pressurized flow air from at least one engine of the aircraft, the thermal management system comprising:
     at least one pressurized-air/oil heat exchanger configured to provide heat exchange between a stream of the pressurized air and a first oil circuit, allowing heat to be transferred from the pressurized air to oil of the first oil circuit to obtain cooled pressurized air, the air conditioning pack being configured to treat said cooled pressurized air to provide conditioned air to a cabin of the aircraft;

at least one oil/flow-air heat exchanger configured to provide heat exchange between a second oil circuit and the non-pressurized flow air, allowing heat from said second oil circuit to be transferred to the non-pressurized flow air; and at least one circuit fluidically connecting the first oil circuit and said second oil circuit.

2. The air conditioning system according to claim 1, wherein the oil is an engine oil and the thermal management system comprises a lubrication passage designed to lubricate and cool bearings of the at least one engine of the aircraft using the engine oil, said lubrication passage being integrated in the first oil circuit or the second oil circuit.

3. The air conditioning system according to claim 1, wherein the at least one oil/flow-air heat exchanger is arranged in the at least one engine of the aircraft and is configured to have a heat exchange surface in direct contact with a stream of the non-pressurized flow air passing through the at least one engine.

4. The air conditioning system according to claim 3, wherein the at least one oil/flow-air heat exchanger is arranged in an engine casing of the at least one engine.

5. The air conditioning system according to claim 4, wherein the at least one oil/flow-air heat exchanger is arranged at a flow-air inlet in the engine casing.

6. The air conditioning system according to claims 1, wherein the at least one pressurized-air/oil heat exchanger and the at least one oil/flow-air heat exchanger are arranged in series.

7. The air conditioning system according to claims 1, wherein the at least one pressurized-air/oil heat exchanger and the at least one oil/flow-air heat exchanger are arranged in parallel.

8. The air conditioning system according to claim 1, wherein the thermal management system comprises at least one circuit for bypassing the at least one pressurized-air/oil heat exchanger, the at least one circuit configured to control a temperature of the pressurized air.

9. An aircraft comprising:

at least one engine; and an air conditioning system, the air conditioning system comprising:
  at least one compressor:
  an air conditioning pack; and
  a thermal management system supplied with pressurized air, by the at least one compressor, and supplied with non-pressurized flow air from the at least one engine, the thermal management system comprising:
    at least one pressurized-air/oil heat exchanger configured to provide heat exchange between a stream of the pressurized air and a first oil circuit, allowing heat to be transferred from the pressurized air to the oil of the first oil circuit to obtain cooled pressurized air, the air conditioning pack being configured to treat said cooled pressurized air to provide conditioned air to a cabin of the aircraft;
    at least one oil/flow-air heat exchanger configured to provide heat exchange between a second oil circuit and the non-pressurized flow air, allowing heat from said second oil circuit to be transferred to the non-pressurized flow air; and
    at least one circuit fluidically connecting the first oil circuit and said second oil circuit.

* * * * *